(12) United States Patent
Gupta

(10) Patent No.: US 11,403,684 B2
(45) Date of Patent: *Aug. 2, 2022

(54) SYSTEM, MANUFACTURE, AND METHOD FOR PERFORMING TRANSACTIONS SIMILAR TO PREVIOUS TRANSACTIONS

(71) Applicant: The Western Union Company, Denver, CO (US)

(72) Inventor: Abhinav Gupta, Foster City, CA (US)

(73) Assignee: The Western Union Company, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/655,925

(22) Filed: Oct. 17, 2019

(65) Prior Publication Data

US 2020/0051146 A1 Feb. 13, 2020

Related U.S. Application Data

(63) Continuation of application No. 15/251,132, filed on Aug. 30, 2016, now Pat. No. 10,489,834.

(51) Int. Cl.
*G06Q 30/00* (2012.01)
*G06Q 30/06* (2012.01)
(Continued)

(52) U.S. Cl.
CPC ....... *G06Q 30/0601* (2013.01); *G06Q 20/047* (2020.05); *G06Q 20/10* (2013.01);
(Continued)

(58) Field of Classification Search
CPC ... G06Q 30/0601–0645; G06Q 20/047; G06Q 20/10; G06Q 20/102; G06Q 20/382;
(Continued)

(56) References Cited

U.S. PATENT DOCUMENTS 7,548,886 B2 6/2009 Kirkland et al.
7,970,705 B2 6/2011 Patterson
(Continued)

OTHER PUBLICATIONS

"Trusteer Provides Holistic Protection for Mobile and Online Banking Channels; Trusteer Mobile Risk Engine Stops Account Takeover from Mobile Devices and Blocks Mobile Malware and Hybrid PC/Mobile Attacks." M2 Presswire, May 29, 2013, p. n/a. ProQuest. Web. Oct. 7, 2021 (Year: 2013).*

(Continued)

*Primary Examiner* — Jeffrey A. Smith
*Assistant Examiner* — Kennedy Gibson-Wynn
(74) *Attorney, Agent, or Firm* — Kilpatrick Townsend & Stockton LLP

(57) ABSTRACT

According to the invention, a method for initiating a similar transaction to one previously initiated by a user is disclosed. The method may include sending a digital receipt for a first transaction to a user. The method may also include determining reminder information, where the reminder information indicates a future time or frequency. The method may further include sending to the user, upon occurrence of the future time or frequency, a digital reminder which includes an interactive element. The method may additionally include receiving an indication that the user has interacted with the interactive element, and initiating a second transaction having a characteristic in common with the first transaction based on the indication.

17 Claims, 7 Drawing Sheets

(51) Int. Cl.
  *G06Q 20/10* (2012.01)
  *H04W 4/14* (2009.01)
  *G06Q 20/04* (2012.01)
  *H04L 51/046* (2022.01)
  *H04L 51/18* (2022.01)
(52) U.S. Cl.
  CPC ............. *H04W 4/14* (2013.01); *H04L 51/046* (2013.01); *H04L 51/18* (2013.01)
(58) Field of Classification Search
  CPC ........... G06Q 20/405–425; H04W 4/14; H04L 51/046; H04L 51/18
  USPC ................................................ 705/26.1–27.2
  See application file for complete search history.

(56) References Cited

U.S. PATENT DOCUMENTS

| | | | |
|---|---|---|---|
| 8,538,824 | B1 | 9/2013 | Mckay et al. |
| 8,788,945 | B1 | 7/2014 | Jesensky et al. |
| 10,366,378 | B1* | 7/2019 | Han .................... G06Q 20/204 705/17 |
| 10,489,834 | B2 | 11/2019 | Gupta |
| 2005/0160038 | A1 | 7/2005 | Albornoz |
| 2007/0061257 | A1 | 3/2007 | Neofytides et al. |
| 2012/0179531 | A1* | 7/2012 | Kim ....................... G06Q 30/06 705/14.26 |
| 2015/0032602 | A1 | 1/2015 | Blackhurst et al. |
| 2015/0324770 | A1 | 11/2015 | Starikova et al. |
| 2015/0332223 | A1 | 11/2015 | Aaron et al. |
| 2016/0255505 | A1* | 9/2016 | Oberheide ............ H04W 12/06 |
| 2016/0300199 | A1 | 10/2016 | Guido et al. |
| 2017/0076265 | A1* | 3/2017 | Royyuru ............ G06Q 20/3223 |
| 2018/0060927 | A1 | 3/2018 | Gupta |

OTHER PUBLICATIONS

Santamorena, Lori. "What's in Your Digital Wallet? is it Your Identity and have You Lost Your Personhood?" Order No. 10036350 Georgetown University, 2016. Ann Arbor: ProQuest. Web. Feb. 25, 2022. (Year: 2016).*

"BSG Clearing Solutions Launches Biii2Phone(TM) Revenue Optimization for Digital Content Merchants", Business Wire, 2007.

* cited by examiner

SYSTEM, MANUFACTURE, AND METHOD FOR PERFORMING TRANSACTIONS SIMILAR TO PREVIOUS TRANSACTIONS

REFERENCE TO RELATED APPLICATION

This application is a continuation of U.S. patent application Ser. No. 15/251,132, filed Aug. 30, 2016, and entitled "System and Method for Performing Transactions Similar to Previous Transactions". The entire disclosure of the above application is hereby incorporated by reference, for all purposes, as if fully set forth herein.

BACKGROUND OF THE INVENTION

This invention relates generally to specialized financial transaction systems. More specifically the invention relates to specialized financial transaction systems which are used to increase capture of repeat business from existing customers.

BRIEF DESCRIPTION OF THE INVENTION

In one embodiment, a method for initiating a similar transaction to one previously initiated by a user is provided. The method may include sending a digital receipt for a first transaction to a user. The method may also include determining reminder information, where the reminder information indicates a future time or frequency. The method may further include sending, upon occurrence of the future time or frequency, a digital reminder to the user, where the digital reminder includes an interactive element. The method may additionally include receiving an indication that the user has interacted with the interactive element. The method may moreover include initiating a second transaction having at least one characteristic in common with the first transaction based at least in part on the indication being received.

In another embodiment, a system for initiating a similar transaction to one previously initiated by a user is provided. The system may include one or more specialized transaction recurrence servers. The one or more specialized transaction recurrence servers may be configured to send a digital receipt for a first transaction to a user. The servers may also be configured to determine reminder information, where the reminder information indicates a future time or frequency. The servers may further be configured to send, upon occurrence of the future time or frequency, a digital reminder to the user, where the digital reminder includes an interactive element. The servers may additionally be configured to receive an indication that the user has interacted with the interactive element. The servers may moreover be configured to initiate a second transaction having at least one characteristic in common with the first transaction based at least in part on the indication being received.

In another embodiment, a non-transitory machine readable medium having instructions stored thereon for initiating a similar transaction to one previously initiated by a user is provided. The instructions may be executable by one or more processors to send a digital receipt for a first transaction to a user. The instructions may also be executable to determine reminder information, where the reminder information indicates a future time or frequency. The instructions may further be executable to send, upon occurrence of the future time or frequency, a digital reminder to the user, where the digital reminder includes an interactive element. The instructions may additionally be executable to receive an indication that the user has interacted with the interactive element. The instructions may moreover be executable to initiate a second transaction having at least one characteristic in common with the first transaction based at least in part on the indication being received.

BRIEF DESCRIPTION OF THE DRAWINGS

The present invention is described in conjunction with the appended figures.

Figure 1:
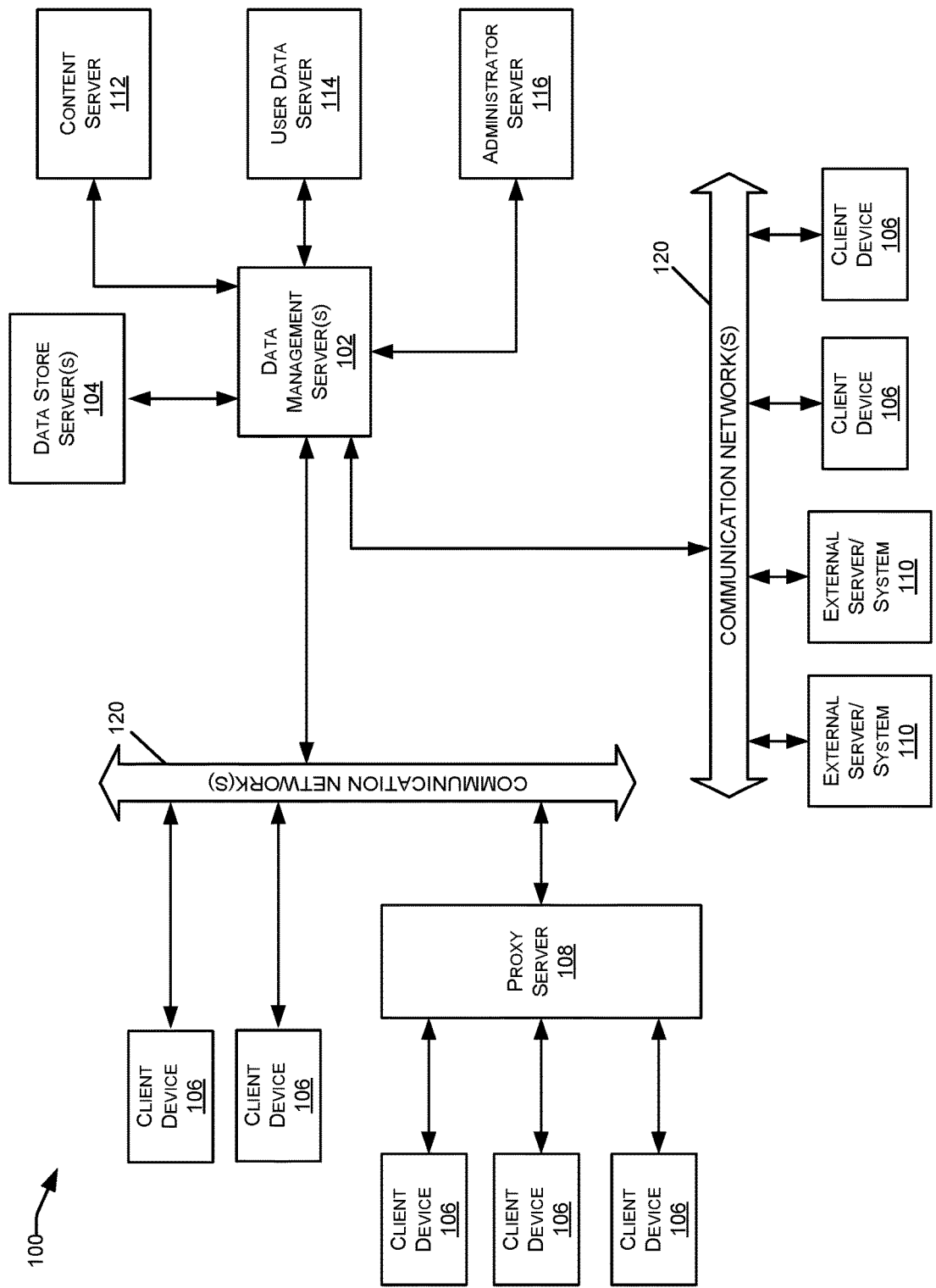
FIG. 1 is a block diagram showing illustrating an example of an electronic transfer network, according to one or more embodiments of the disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Various techniques (e.g., systems, methods, computer-program products tangibly embodied in a non-transitory computer-readable storage medium, etc.) are described herein for receiving and handling transfer requests involving client devices at different locations or domains within a transfer system. In some embodiments, one or more transfer servers may receive transfer requests from sender devices and/or receiver devices associated with different locations or domains within a transfer system. Transfer servers may receive and evaluate offers from a number of granter systems in response to the requested transfer between the sender device and receiver device. In some cases, specific granter systems and/or specific offers may be available only within certain locations or domains with a transfer system, and not within other locations or domains. Transfer servers may evaluate the offers for the requested transfer based on sender credentials, receiver credentials, and/or a combination of sender and receiver credentials, and may identify one or more combinations of qualifying offers having aggregate values sufficient to cover the requested transfer value. From the qualifying offer combinations, a specific set of offers may be determined for performing the requested transfer, and the transfer may be initiated between the sender device in a first location and the receiver device in a second location within the transfer system.

In accordance with certain techniques discussed herein, specific combinations of offers may be selected from granter systems available in different locations, to use for transfers between a sender devices and receiver devices in different locations or domains. In some embodiments, sender credentials only may be initially used to identify a first set of offers available at the sender's location. In response to the identified first set of offers, the sender's credentials may be updated, and a second set of offers may be identified at the receiver's location based on the updated sender's credentials. The sender's credentials may be updated again in response to the identified second set of offers, and a combination of the receiver's credentials and the updated sender's credentials may be generated. Using the combination of receiver and updated sender credentials, an additional set of available offers may be identified across the sender's location and the receiver's location. Finally, a number of qualifying offer combinations may be generated from the combined sets of available offers, and a selected or optimal offer combinations may be identified to use for performing the requested transfer With reference now to FIG. 1, a block diagram is shown illustrating various components of an electronic transfer network 100 which implements and supports certain embodiments and features described herein. As discussed below in more detail, various embodiments of electronic transfer networks 100 may be implemented and configured to perform secure transfers between client devices 106, systems servers (e.g., 102), and/or external systems 110. In some embodiments, the various computing devices and systems shown in FIG. 1 may correspond to different physical or virtual domains/regions, for instance, different geographic areas within different jurisdictions, different data centers, different networks, different computing infrastructures, etc. As described herein, secure transfers may include transfers of various different types of data items (e.g., files, database records, media or other content resources, etc.), as well as other secure data transactions or other interactions between a sender and receiver devices/servers. In some embodiments, the electronic transfer network 100 may be configured to operate as a value transfer system by which users at client devices 106 may initiate value transfers to users at other client devices 106. In such cases, management servers 102 and/or external systems 110 may correspond to secure systems operated by financial institutions or other entities, by which sender and receiver credentials and value transfer requests may be received and analyzed, and value-based transactions may be authorized and performed.

Thus, in various embodiments, electronic transfer network 100 may be configured to support and perform transfers of various currency types, including traditional and/or digital currencies, centralized and/or de-centralized currencies, cryptocurrencies, and any other medium of exchange (e.g., credit, gift cards or certificates, points in a user point system, etc.), between client devices 106 and/or external systems 110 in different areas, regions, or jurisdictions. In other embodiments, the electronic transfer network 100 may be configured to perform other types of multi-party data transfers and/or secure transactions, such as transfers of data items including secure files, records, and/or content resources, between client devices 106 and other client devices 106, management servers 102 and/or external systems 110. For such transfers, the endpoint systems may be operating in the same location, using the same communication networks 120, and/or using the same computing hardware and software infrastructure, or may operate in different locations, on different networks, and/or in different datacenters, etc. Data management servers 102 and relate servers (e.g., 104, 108, 112, 114, 116, etc.) in some embodiments, may correspond to authentication systems, data access/permission systems, subscription monitor systems, network access providers, and/or any other servers that may be used to monitor, permit/deny access, and/or enable data transfers. In still other embodiments, network 100 may be implemented as part of interactive gaming systems, educational and profession training systems, and/or social network systems, to enable the transfer of certain data or values (e.g., points, credits, resources, etc.) between users on different systems and/or in different locations.

As shown in FIG. 1, electronic transfer network 100 may include one or more data management servers 102. Data management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Data management servers 102 may include one or more server farms, clusters, or any other appropriate arrangement and/or combination or computer servers. Data management servers 102 may act according to stored instructions located in a memory subsystem of the servers 102, and may run an operating system, including any commercially available server operating system and/or any other operating systems discussed herein.

The electronic transfer network 100 may include one or more data store servers 104, such as database servers and file-based storage systems. Data stores 104 may include stored data relevant to the functions of the electronic transfer network 100. Illustrative examples of data stores 104 that may be maintained in certain embodiments of the electronic transfer network 100 are described below in reference to FIG. 4. In some embodiments, multiple data stores may reside on a single server 104, either using the same storage components of server 104 or using different physical storage components to assure data security and integrity between data stores. In other embodiments, each data store may have a separate dedicated data store server 104.

Electronic transfer network 100 also may include one or more client devices 106. Client devices 106 may display data received via the electronic transfer network 100, and may support various types of user interactions with the data. Client devices 106 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other client devices 106 may be general purpose personal computers or special-purpose computing devices including, by way of example, personal computers, laptop computers, workstation computers, projection devices, and interactive room display systems. Additionally, client devices 106 may be any other electronic devices, such as thin-client computers, Internet-enabled gaming systems, business or home appliances, and/or personal messaging devices, capable of communicating over network(s) 120. In some embodiments, one or more client devices 106 may include digital kiosk devices such as point-of-sale terminals, value transfer terminals, and/or digital advertising or display devices, including some or all of the features described below in reference to FIG. 2.

In different contexts of electronic transfer networks 100, client devices 106 may correspond to different types of specialized devices, for example, employee devices and presentation devices in a company network, gaming devices in a gaming network, networked point-of-sale terminals or digital advertising terminals in a retail network, etc. In some embodiments, client devices 106 may operate in the same physical location, such as the conference room or same store. In such cases, the devices 106 may contain components that support direct communications with other nearby devices 106, such as a wireless transceivers and wireless communications interfaces, Ethernet sockets or other Local Area Network (LAN) interfaces, etc. In other implementations, the client devices 106 need not be used at the same physical location, but may be used in remote geographic locations in which each client device 106 may use security features and/or specialized hardware (e.g., hardware-accelerated SSL and HTTPS, WS-Security, firewalls, etc.) to communicate with the data management server 102 and/or other remotely located client devices 106. Additionally, different client devices 106 may be assigned different designated roles, such as sender devices, receiver devices, administrator devices, or the like, and in such cases the different devices may be provided with additional hardware and/or software components to provide content and support user capabilities not available to the other devices.

The electronic transfer network 100 also may include one or more proxy servers 108 configured to operate between a set of related client devices 106 and the back-end server(s) 102. In some cases, proxy server 108 may maintain private user information for client devices 106 interacting with applications or services hosted on other servers. For example, the proxy server 108 may be used to maintain private data of a user within one jurisdiction even though the user is accessing an application hosted on a server (e.g., the data management server 102) located outside the jurisdiction. In such cases, the proxy server 108 may intercept communications between multiple different client devices 106 and/or other devices that may include private user information. The proxy server 108 may create a token or identifier that does not disclose the private information and may use the token or identifier when communicating with the other servers and systems, instead of using the user's private information.

The electronic transfer network 100 also may include one or more external servers/systems 110 configured to connect to the back-end server(s) 102 through various communication networks 120 and/or through proxy servers 108. External servers/systems 110 may include some or all of the same physical and logical components as the data management server(s) 102, and may be configured to provide various data sources and/or services to the other components of the electronic transfer network 100.

As illustrated in FIG. 1, the data management server 102 may be in communication with one or more additional servers, such as a content server 112, a user data server 112, and/or an administrator server 116. Each of these servers may include some or all of the same physical and logical components as the data management server(s) 102, and in some cases, the hardware and software components of these servers 112-116 may be incorporated into the data management server(s) 102, rather than being implemented as separate computer servers.

Content server 112 may include hardware and software components to generate, store, and maintain the content resources for distribution to client devices 106 and other devices in the network 100. For example, in electronic transfer networks 100 used for professional training and educational purposes, content server 112 may include data stores of training materials, presentations, interactive programs and simulations, and various training interfaces that correspond to different materials and/or different types of user devices 106. In content electronic transfer networks 100 used for distribution of media content, advertising, and the like, a content server 112 may include media and advertising content files.

User data server 114 may include hardware and software components that store and process data for multiple users relating to each user's activities and usage of the electronic transfer network 100. For example, the data management server 102 may record and track each user's system usage, including their client device 106, data accessed and transferred, and interactions with other client devices 106. This data may be stored and processed by the user data server 114, to support user tracking and analysis features. For instance, in business training contexts, the user data server 114 may store and analyze each user's training materials viewed, courses completed, interactions, and the like. In the context of advertising, media distribution, and interactive gaming, the user data server 114 may store and process resource access data for multiple users (e.g., data files accessed, access times, data usage amounts, user histories, user devices and device types, etc.).

Administrator server 116 may include hardware and software components to initiate various administrative functions at the data management server 102 and other components within the content distribution network 100. For example, the administrator server 116 may monitor device status and performance for the various servers, data stores, and/or client devices 106 in the electronic transfer network 100. When necessary, the administrator server 116 may add or remove devices from the network 100, and perform device maintenance such as providing software updates to the devices in the network 100. Various administrative tools on the administrator server 116 may allow authorized users to set user access permissions to various data resources, monitor resource usage by users and devices 106, and perform analyses and generate reports on specific network users and/or devices (e.g., resource usage tracking reports, training evaluations, etc.).

The electronic transfer network 100 may include one or more communication networks 120. Although two networks 120 are identified in FIG. 1, the electronic transfer network 100 may include any number of different communication networks between any of the computer servers and devices shown in FIG. 1 and/or other devices described herein. Communication networks 120 may enable communication between the various computing devices, servers, and other components of the electronic transfer network 100. As discussed below, various implementations of electronic transfer networks 100 may employ different types of networks 120, for example, computer networks, telecommunications networks, wireless networks, and/or any combination of these and/or other networks.

As noted above, in certain embodiments, electronic transfer network 100 may be a cryptocurrency network or other network using encryption protocols and techniques for performing transfers of cryptocurrency and/or other alternative digital currencies. Illustrative and non-limiting examples of such cryptocurrency networks may include a bitcoin peer-to-peer (P2P) payment network, a Litecoin network, a Peercoin network, and various other private digital cryptocurrency networks. The various computing devices and servers in such cryptocurrency networks 100, including client devices 106, management servers 102, and/or external systems 110, may be configured to perform cryptocurrency transfers as senders and/or receivers. For example, a client device 106 may securely store a private cryptographic key associated with a cryptocurrency account of a user, and may use specialized client software (e.g., cryptocurrency wallet application) to generate digital cryptographic signatures using the private cryptographic key and data identifying the details of the requested cryptocurrency transfer. In some cases, the cryptocurrency client application may execute a cryptographic hash function to generate a hash value signature based on the private key value associated with the cryptocurrency account. Recipient client devices 106, as well as other servers/systems in the network 100, may use the public key of the sender to decrypt the cryptographic signature and verify the authenticity of the requested cryptocurrency transfer. Some or all of the client devices 106, servers 102, and/or external systems 110 may use databases or other secure storage to independently maintain and update electronic ledgers for tracking the current balances associated with cryptocurrency accounts.

In some embodiments, certain computing devices and servers in a cryptocurrency network 100 may function as miner systems that are configured to perform complex mathematical operations in order to produce new cryptocurrency. Thus, various client devices 106, servers 102, and/or external systems 110 may be implemented as cryptocurrency miners. In some cases, these devices/systems may include specialized hardware and software designed for cryptocurrency mining, such as application-specific integrated circuits (ASICs) that are specifically designed and configured for cryptocurrency mining and/or specialized cryptocurrency mining software. In some cases, specialized cryptocurrency mining software may be used to allow collaboration between multiple different devices/systems which may function as a mining pool.

In some embodiments, various computing devices and servers in a cryptocurrency network 100 may be configured to collaboratively generate and store universal public ledgers and/or transaction chains for the cryptocurrency network 100. For example, computing devices and systems within the cryptocurrency network 100 may be configured to retrieve individual cryptocurrency transactions from a pool and resolve the transactions by solving associated mathematical problems, such as cryptographic hashes. After the problem is solved, the associated cryptocurrency transaction may be added to a universal transaction chain which is shared by other devices and systems of the cryptocurrency network 100. Each device/system in the cryptocurrency network 100 may independent maintain a copy of the transaction chain, and may periodically (or upon request from other systems) share their copy of the transaction chain in order to synchronize and reconcile different versions.

In some embodiments, a transaction chain for a cryptocurrency system/network may be stored in a distributed database by multiple different data nodes at different devices/servers within the network 100. For example, blockchain technology may be used to implement a decentralized distributed database which may be hosted by a combination of client devices 106, data management servers 102, and/or external systems 110. The blockchain (or other decentralized storage system) may store a distributed electronic ledger and/or universal transaction chain for the cryptocurrency network 100. The blockchain may be accessed by individual client software (e.g., wallet applications) of client devices 106, which may propose a cryptocurrency value transfer to be added to the blockchain. After analyzing and authorizing the requested transfer (e.g., by confirming that there is sufficient cryptocurrency value in the sender's account), a miner node within the cryptocurrency network 100 may bundle the transfer with other transactions to create a new block to be added to the blockchain. In some cases, adding blocks to the blockchain may involve miner nodes repeatedly executing cryptographic hash functions, ensuring that the blockchain cannot be tampered with by any malicious systems within the network 100.

As noted above, the client devices 106 in the electronic transfer network 100 may include various mobile devices, such as smartphones, tablet computers, personal digital assistants, wearable computing devices, bodily implanted communication devices, vehicle-based devices, etc. Within an electronic transfer network 100, mobile devices 106 may be configured to support mobile payment and/or mobile money transfer functionality. Such mobile devices 106 may initiate and receive communications via the Internet, e-mail, short message service (SMS), Bluetooth®, mobile radio-frequency identification (M-RFID), near-field communication (NFC) and/or various other communication protocols. In some cases, mobile devices 106 may execute a mobile wallet application to store user data and support secure data and/or value transfers via various different techniques, for example, SMS-based transactional payments, direct mobile billing, Web Application Protocol mobile payments, and NFC-based payments.

In some examples, the electronic transfer network 100 shown in FIG. 1 may correspond to an interactive user platform, such as a social networking platform or messaging platform. In such cases, an electronic transfer technology platform may be integrated within the social networking and/or messaging platform 100, in order to provide interactive users with the capabilities to perform quick and convenient value transfers with other users anywhere in the world. Such embodiments may apply to various different collaborative user platforms and applications, including social media applications, email applications, chat and messaging applications, online gaming applications, and the like. These applications may be executed on client devices 106 and may transmit communications to and/or establish communication sessions with corresponding applications on other client devices 106 and/or external systems 110. In some embodiments, the secure data and/or value transfer capabilities of one or more transfer services providers may be embedded into various collaborative user platforms. For example, from within a social networking or messaging application running on client device 106, a user may be able to request and fund value transfers utilizing a debit card, credit card, or bank account, and easily direct the funds to another user on the same collaborative platform, or to retail agent location and/or to a mobile wallet or bank account. Integration of secure value transfer technologies within social networking applications, messaging applications, and the like, may provide a cross-border platform for transfer services that enables pay-in and pay-out capabilities that leverage technology, foreign exchange conversion, data management, as well as regulatory, compliance and anti-money laundering (AML) infrastructure of the transfer service provider, to expedite efficient and timely transfers. In such cases, the technology platform used to support secure data and/or value transfers within the network 100 may be accessible to messaging, social, and other digital networks, and may offer a suite of APIs built on a highly scalable infrastructure, enabling fast deployment of domestic and cross-border remittance capabilities.

Figure 2:
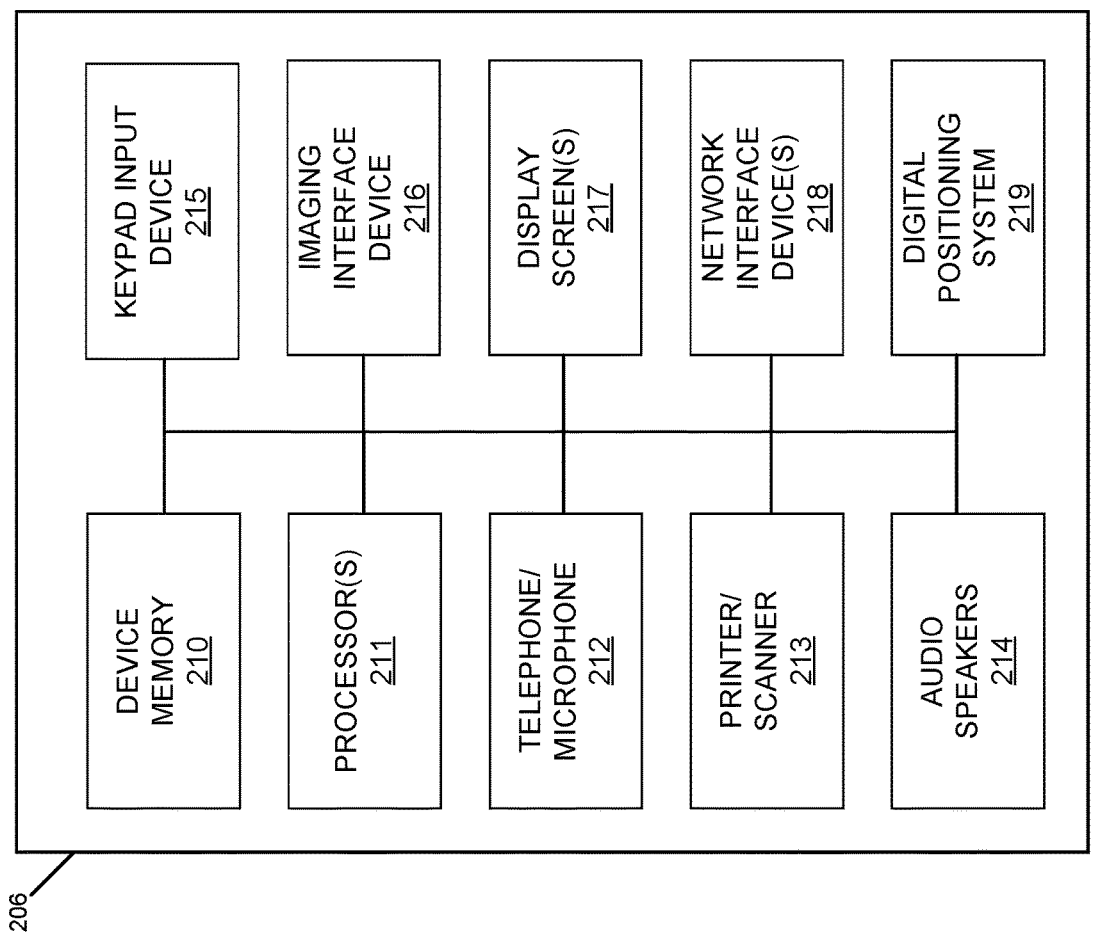
FIG. 2 is a block diagram illustrating various components and features of a digital kiosk client device, according to one or more embodiments of the disclosure.

Referring now to FIG. 2, a simplified block diagram is illustrating showing a digital kiosk device 206. In some embodiments, digital kiosk devices 206 may be another example of client devices 106. The digital kiosk device 206 may be implemented, for example, as a kiosk in a retail store, a value transfer terminal for performing value transfers (e.g., transfers of money and other assets, submitting payments to payees, etc.), a point-of-sale terminal, an electronic advertising system, and/or other various electronic display systems. The digital kiosk device 206 may be operated by a user (e.g., customer, shopper), and/or by agent, employee, or representative of a business providing or operating the kiosk 206. In various embodiments, the digital kiosk device 206 may include one or more of: a memory system 210, a processing unit 211, a telephone/microphone I/O component system 212, a printer/scanner I/O component system 213, an audio speaker system 214, a keypad input device 215, an imaging interface device 216, one or more digital display screens 217, one or more network interface devices 218 (e.g., network interface controllers, RF transceivers, etc.), and a digital positioning system 219 (e.g., Global Positioning System (GPS) receiver device). In various embodiments, digital kiosk devices 206 may include a touch screen that functions as the display screen 217 and/or the keypad 215. The keypad 215 may instead be any device that accepts user input, such as a trackball, mouse, or joystick. The imaging interface device 216 may serve to allow the digital kiosk device 206 to communicate with an imaging device. Alternatively, an imaging device may be directly incorporated into the digital kiosk device 206. Speakers 214 may be any audio output device. The printer 213 may be used to provide the user a receipt, point-of-sale information (e.g., product information, order confirmation, etc.), coupon, advertisement, or other information to be taken with the user, and scanner 213 may be used to scan a QR Code or barcode identifying a user or transaction, transfer request, user identification card, coupon, or the like. In some embodiments, a telephone/microphone 212 may be used in conjunction with speakers 214 to interact with the digital kiosk device 206, or a remotely located user (e.g., counterpart user in a transaction, customer representative, etc.) when performing a transfer or requesting information. Digital kiosk devices 206 may include various different types of digital position systems 219 (or geo-location systems 219), such as a Global Positioning System (GPS) receiver, so that kiosk location data may be collected and returned to data management servers 102 and/or other client devices 106. In some cases, such kiosk location data may be used to determine which content a specific digital kiosk device 206 is permitted to receive (e.g., based on domain/jurisdiction), and also may be used to determine factors such as language, data availability, network availability, product availability, and the like.

Figure 3:
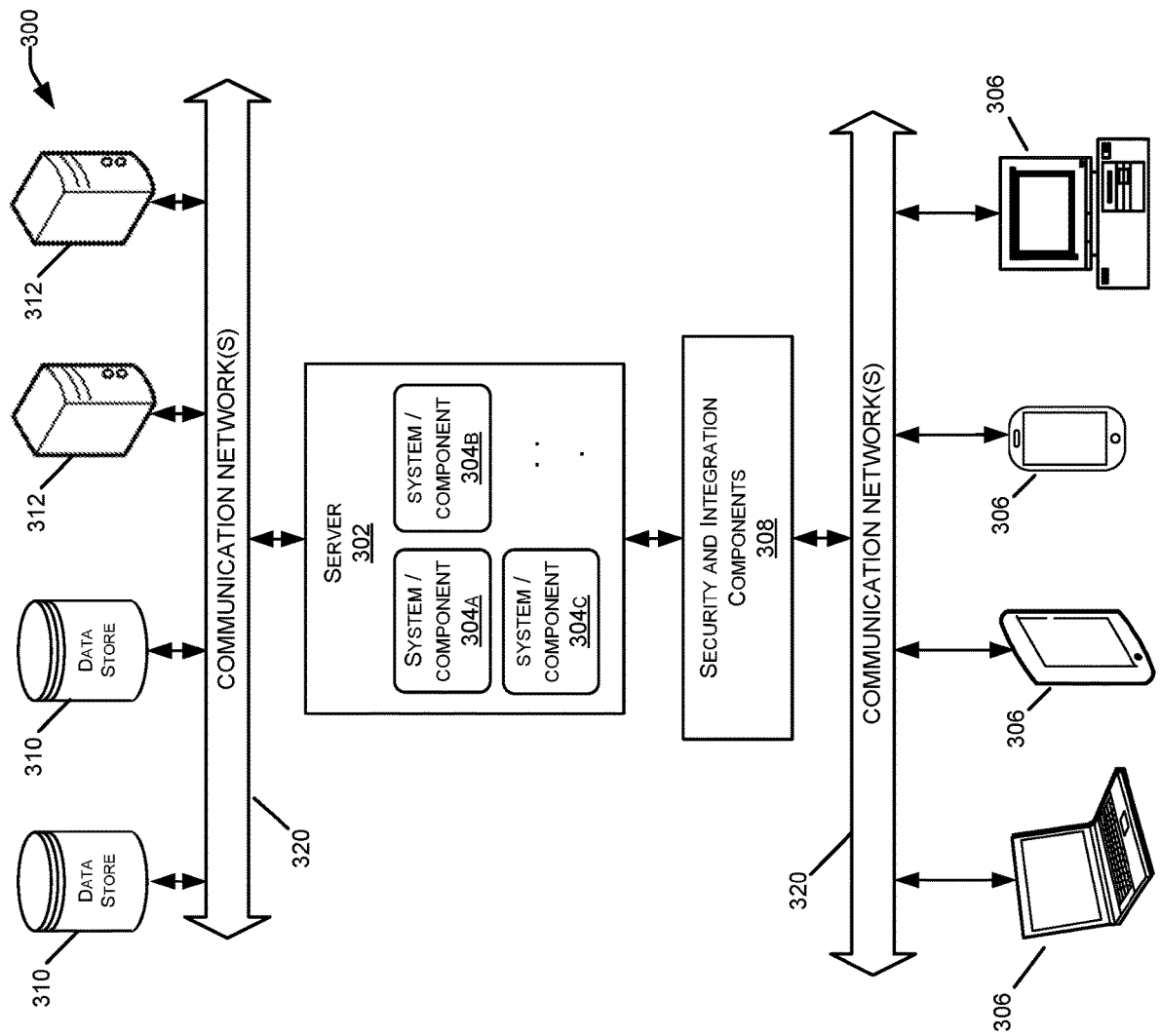
FIG. 3 is a block diagram illustrating a computer server and computing environment within an electronic transfer network, according to one or more embodiments of the disclosure.

With reference to FIG. 3, an illustrative distributed computing environment 300 is shown including a computer server 302, four client computing devices 306, and other components that may implement certain embodiments and features described herein. In some embodiments, the server 302 may correspond to the data management server 102 discussed above in FIG. 1, and the client computing devices 306 may correspond to the client devices 106 and/or 206. However, the computing environment 300 illustrated in FIG. 3 also may correspond to any other combination of devices and servers configured to implement a client-server model or other distributed computing architecture.

Client devices 306 may be configured to receive and execute client applications over one or more networks 320. Such client applications may be web browser based applications and/or standalone software applications, such as mobile device applications. Server 302 may be communicatively coupled with the client devices 306 via one or more communication networks 220. Client devices 306 may receive client applications from server 302 or from other application providers (e.g., public or private application stores). Server 302 may be configured to run one or more server software applications or services, for example, web-based or cloud-based services, to support content distribution and interaction with client devices 306. Users operating client devices 306 may in turn utilize one or more client applications (e.g., virtual client applications) to interact with server 302 to utilize the services provided by these components.

Various different subsystems and/or components 304 may be implemented on server 302. Users operating the client devices 306 may initiate one or more client applications to use services provided by these subsystems and components. The subsystems and components within the server 302 and client devices 306 may be implemented in hardware, firmware, software, or combinations thereof. Various different system configurations are possible in different distributed computing systems 300 and electronic transfer networks 100. The embodiment shown in FIG. 3 is thus one example of a distributed computing system and is not intended to be limiting.

Although exemplary computing environment 300 is shown with four client computing devices 306, any number of client computing devices may be supported. Such client 306 may include digital kiosk devices including some or all of the features described below in reference to FIG. 2. Other devices, such as specialized sensor devices, etc., may interact with client devices 306 and/or server 302.

As shown in FIG. 3, various security and integration components 308 may be used to send and manage communications between the server 302 and user devices 306 over one or more communication networks 320. The security and integration components 308 may include separate servers, such as web servers and/or authentication servers, and/or specialized networking components, such as firewalls, routers, gateways, load balancers, and the like. In some cases, the security and integration components 308 may correspond to a set of dedicated hardware and/or software operating at the same physical location and under the control of same entities as server 302. For example, components 308 may include one or more dedicated web servers and network hardware in a datacenter or a cloud infrastructure. In other examples, the security and integration components 308 may correspond to separate hardware and software components which may be operated at a separate physical location and/or by a separate entity.

Security and integration components 308 may implement various security features for data transmission and storage, such as authenticating users and restricting access to unknown or unauthorized users. In various implementations, security and integration components 308 may provide, for example, a file-based integration scheme or a service-based integration scheme for transmitting data between the various devices in the electronic transfer network 100. Security and integration components 308 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 308 and/or elsewhere within the electronic transfer network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 302 and client devices 306. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML, encryption. In other examples, the security and integration components 308 may include specialized hardware for providing secure web services. For example, security and integration components 308 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 320 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 320 may be local area networks (LAN), such as one based on Ethernet, Token-Ring and/or the like. Network(s) 320 also may be wide-area networks, such as the Internet. Networks 320 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 320.

Computing environment 300 also may include one or more data stores 310 and/or back-end servers 312. In certain examples, the data stores 310 may correspond to data store server(s) 104 discussed above in FIG. 1, and back-end servers 312 may correspond to the various back-end servers 110-116. Data stores 310 and servers 312 may reside in the same datacenter or may operate at a remote location from server 302. In some cases, one or more data stores 310 may reside on a non-transitory storage medium within the server 302. Other data stores 310 and back-end servers 312 may be remote from server 302 and configured to communicate with server 302 via one or more networks 320. In certain embodiments, data stores 310 and back-end servers 312 may reside in a storage-area network (SAN), or may use a storage-as-a-service (STaaS) architectural model.

Figure 4:
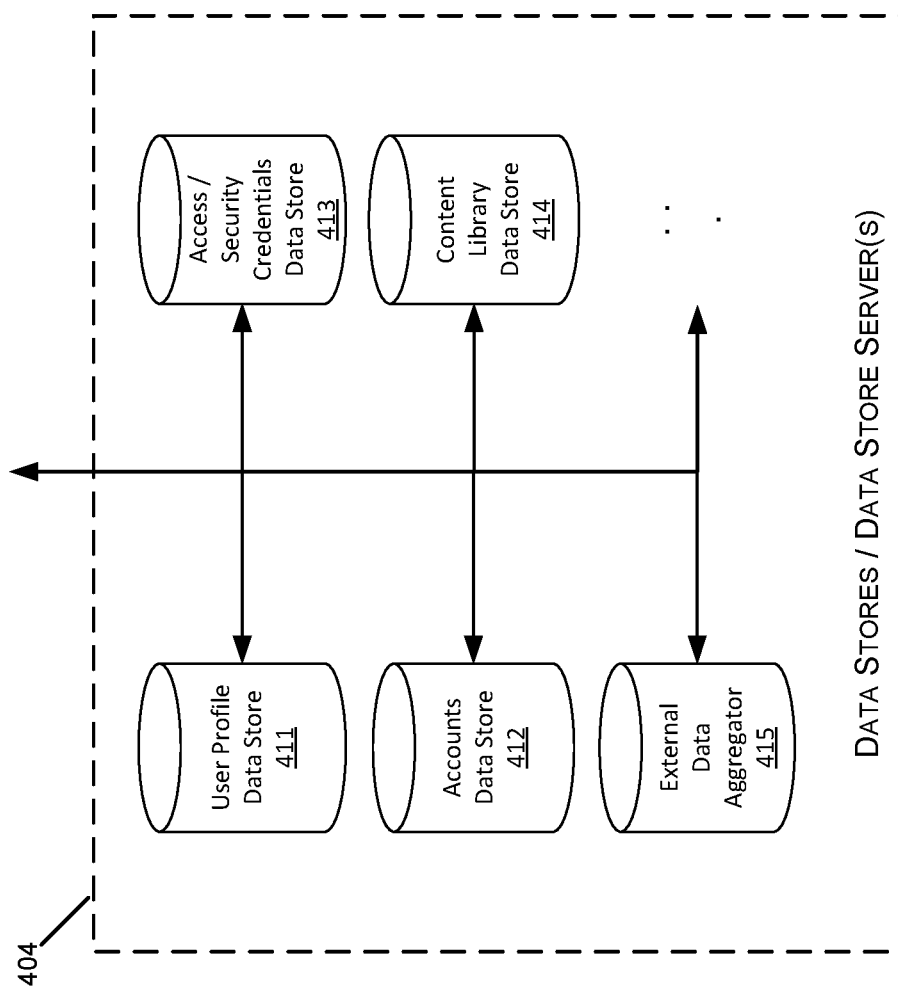
FIG. 4 is a block diagram illustrating an embodiment of one or more data store servers within an electronic transfer network, according to one or more embodiments of the disclosure.

With reference to FIG. 4, an illustrative set of data stores and/or data store servers is shown, corresponding to the data store servers 104 of the electronic transfer network 100 discussed above in FIG. 1. One or more individual data stores 411-415 may reside in storage on a single computer server 104 (or a single server farm or cluster) under the control of a single entity, or may reside on separate servers operated by different entities and/or at remote locations. In some embodiments, data stores 411-415 may be accessed by the data management server 102 and/or other devices and servers within the network 100 (e.g., client devices 106, external systems 110, administrator servers 116, etc.). Access to one or more of the data stores 411-415 may be limited or denied based on the processes, user credentials, and/or devices attempting to interact with the data store.

The paragraphs below describe examples of specific data stores that may be implemented within some embodiments of an electronic transfer network 100. It should be understood that the below descriptions of data stores 411-415, including their functionality and types of data stored therein, are illustrative and non-limiting. Data stores server architecture, design, and the execution of specific data stores 411-415 may depend on the context, size, and functional requirements of an electronic transfer network 100. For example, in a secure data transfer systems 100 used for professional training, separate databases or file-based storage systems may be implemented in data store server(s) 104 to store trainee and/or trainer data, training module data and content descriptions, training results, evaluation data, and the like. In contrast, in electronic transfer systems 100 used to provide electronic advertising or other content from content providers to client devices, separate data stores may be implemented in data stores server(s) 104 to store listings of available content and descriptions, content usage statistics, client device profiles, account data, network usage statistics, etc.

A user profile data store 411 may include information relating to the end users within the electronic transfer network 100. This information may include user characteristics such as the user names, access credentials (e.g., logins and passwords), user preferences, and information relating to any previous user interactions within the electronic transfer network 100 (e.g., requested data, provided data, system usage data/statistics, associated users, etc.).

An accounts data store 412 may generate and store account data for different users in various roles within the electronic transfer network 100. For example, accounts may be created in an accounts data store 412 for individual end users, administrator users, and external entities such as businesses, governmental or educational institutions. Account data may include account types, current account status, account characteristics, and any parameters, limits, restrictions associated with the accounts.

A content/security credential data store 413 may include access rights and security information for the electronic transfer network 100 and specific files/content resources. For example, the content/security credential data store 413 may include login information (e.g., user identifiers, logins, passwords, etc.) that can be verified during login attempts by users and/or client devices 106 to the network 100. The content/security credential data store 413 also may be used to store assigned user roles and/or user levels of access. For example, a user's access level may correspond to the sets of data and/or the client or server applications that the user is permitted to access. Certain users and/or client devices may be permitted or denied access to certain applications and resources based on their access level, subscription level, etc. Certain users and/or client devices 106 may have supervisory access over one or more end users accounts and/or other client devices 106, allowing the supervisor to access all or portions of the user's content access, activities, etc. Additionally, certain users and/or client devices 106 may have administrative access over some users and/or some applications in the electronic transfer network 100, allowing such users to add and remove user accounts, modify user access permissions, perform maintenance updates on software and servers, etc.

A content library data store 414 may include information describing the individual data items (or resources) available via the electronic transfer network 100. In some embodiments, the content data store 414 may include metadata, properties, and other characteristics associated with the data items stored in the content server 112. Such data may identify one or more aspects or attributes of the associated data items, for example, subject matter or access level of the content resources, license attributes of the data items (e.g., any limitations and/or restrictions on the licensable use and/or distribution of the data items), price attributes of the data items (e.g., a price and/or price structure for determining a payment amount for use or distribution of the data items), language and geographic associations with the data items, and the like. In some embodiments, the content data store 414 may be configured to allow updating of data item metadata or properties, and to allow the addition and/or removal of information relating to the data items. For example, item relationships may be implemented as graph structures, which may be stored in the content data store 414 or in an additional data store for use by selection algorithms along with the other metadata.

In addition to the illustrative data stores described above, data store server(s) 104 (e.g., database servers, file-based storage servers, etc.) may include one or more external data aggregators 415. External data aggregators 415 may include third-party data sources accessible to the electronic transfer network 100, but not maintained by the electronic transfer network 100. External data aggregators 415 may include any electronic information source relating to the users, data items, or applications of the electronic transfer network 100. For example, external data aggregators 415 may be third-party data stores containing demographic data, education related data, financial data, consumer sales data, health related data, and the like. Illustrative external data aggregators 415 may include, for example, social networking web servers, public records data stores, educational institution servers, business servers, consumer sales data stores, medical record data stores, etc. Data retrieved from various external data aggregators 415 may be used to verify and update user account information, suggest or select user content, and perform user and content evaluations. In some cases, external data aggregators 415 may correspond to external servers/systems 110.

Figure 5:
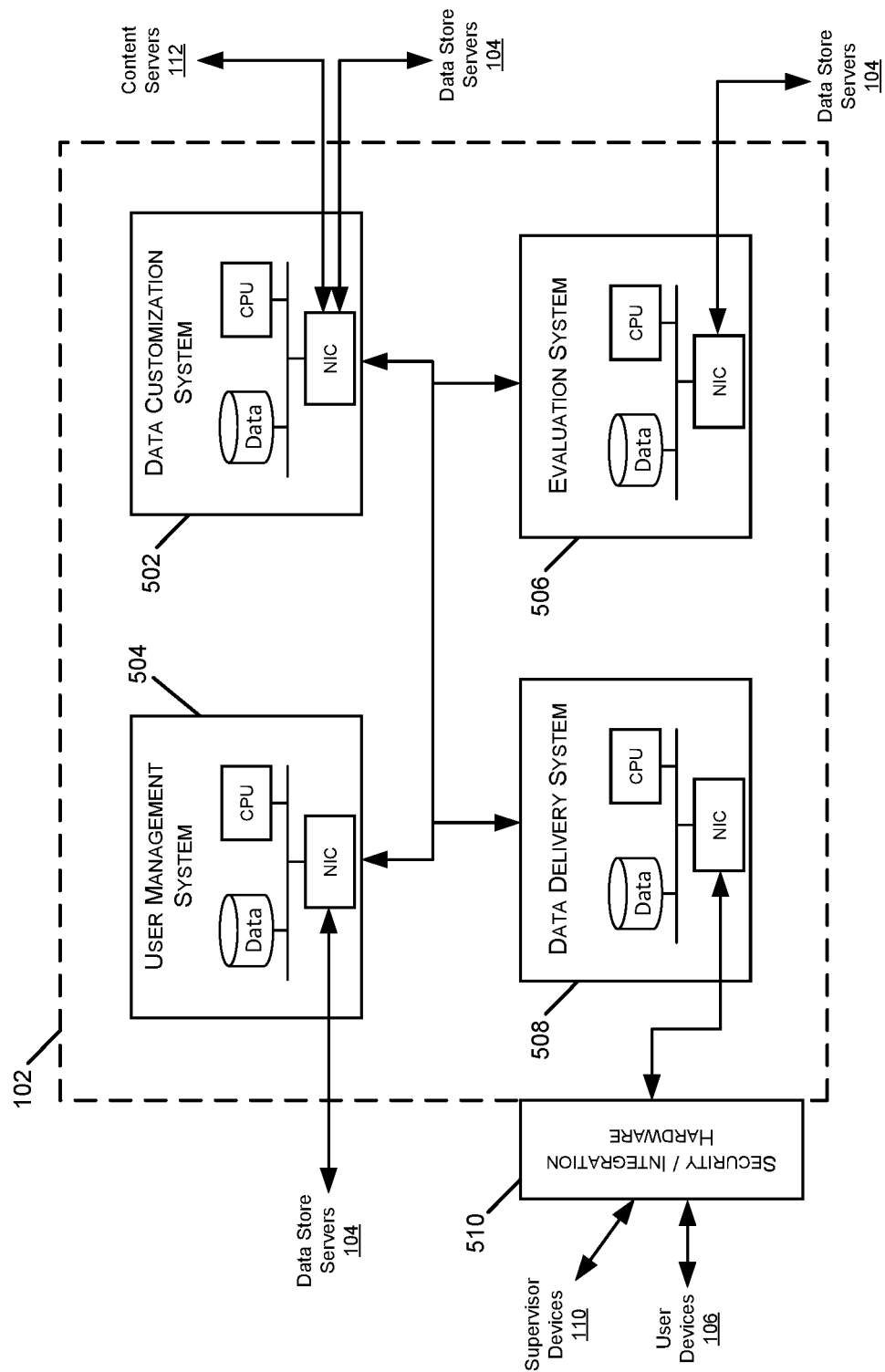
FIG. 5 is a block diagram illustrating an embodiment of one or more content management servers within an electronic transfer network, according to one or more embodiments of the disclosure.

With reference now to FIG. 5, a block diagram is shown illustrating an embodiment of one or more data management servers 102 within an electronic transfer network 100. As discussed above, data management server(s) 102 may include various server hardware and software components that manage the content resources within the electronic transfer network 100 and provide interactive and adaptive content to users on various client devices 106. For example, data management server(s) 102 may provide instructions to and receive information from the other devices within the electronic transfer network 100, in order to manage and transmit data resources, user data, and server or client applications executing within the network 100.

A data management server 102 may include a data customization system 502. The data customization system 502 may be implemented using dedicated hardware within the electronic transfer network 100 (e.g., a data customization server 502), or using designated hardware and software resources within a shared data management server 102. In some embodiments, the data customization system 502 may adjust the selection and adaptive capabilities of data resources to match the needs and desires of the users and/or client devices 106 receiving the content. For example, the data customization system 502 may query various data stores and servers 104 to retrieve user information, such as user preferences and characteristics (e.g., from a user profile data store 411), location/geographic information associated with users and/or client devices 106, user access restrictions to data recourses (e.g., from an access credential data store 413), previous user activity within the network 100, and the like. Based on the retrieved information from data stores 104 and other data sources, the data customization system 502 may modify content resources for individual users and/or individual client devices 106.

A data management server 102 also may include a user management system 504. The user management system 504 may be implemented using dedicated hardware within the electronic transfer network 100 (e.g., a user management server 504), or using designated hardware and software resources within a shared data management server 102. In some embodiments, the user management system 504 may monitor the activities of users and/or user devices 106 with respect to various data resources. For example, the user management system 504 may query one or more databases and/or data store servers 104 to retrieve user data such as associated data resources, access and completion status, results, and the like.

A data management server 102 also may include an evaluation system 506. The evaluation system 506 may be implemented using dedicated hardware within the electronic transfer network 100 (e.g., an evaluation server 506), or using designated hardware and software resources within a shared data management server 102. The evaluation system 506 may be configured to receive and analyze information from client devices 106. For example, various data received by users via client devices 106 may be compiled and analyzed, and then stored in a data store 104 associated with the user and/or data item. In some embodiments, the evaluation server 506 may analyze the information to determine the effectiveness or appropriateness of a data resources with a user or user group, for example, based on subject matter, age group, skill level, or the like. In some embodiments, the evaluation system 506 may provide updates to the data customization system 502 or the user management system 504, with the attributes of one or more data resources or groups of resources within the network 100.

A data management server 102 also may include a data delivery system 508. The data delivery system 508 may be implemented using dedicated hardware within the electronic transfer network 100 (e.g., a data delivery server 508), or using designated hardware and software resources within a shared data management server 102. The data delivery system 508 may receive data from the data customization system 502 and/or from the user management system 504, and transmit the resources to client devices 106. In some embodiments, the data delivery system 508 may determine the appropriate presentation format for the data resources based on the user characteristics and preferences, and/or the device capabilities of client devices 106. If needed, the data delivery system 508 may convert the content resources to the appropriate presentation format and/or compress the content before transmission. In some embodiments, the data delivery system 508 may also determine the appropriate transmission media and communication protocols for transmission of the data to and from client devices 106.

In some embodiments, the data delivery system 508 may include specialized security and integration hardware 510, along with corresponding software components to implement the appropriate security features for data transmission and storage, to provide the supported network and client access models, and to support the performance and scalability requirements of the network 100. The security and integration layer 510 may include some or all of the security and integration components 308 discussed above in FIG. 3, and may control the transmission of data, as well as the receipt of requests and data interactions, to and from the client devices 106, external servers 110, administrative servers 116, and other devices in the network 100.

Figure 6:
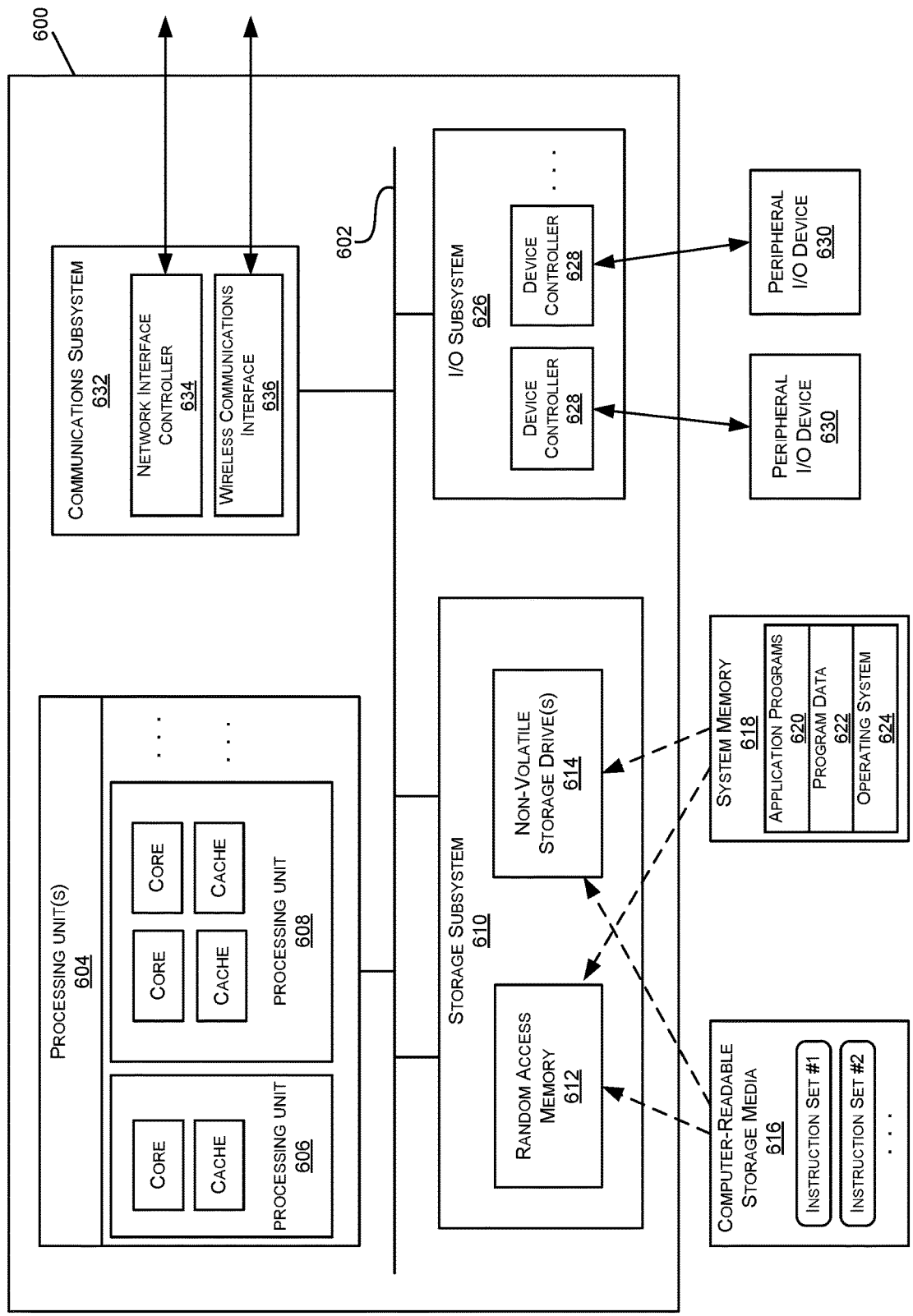
FIG. 6 is a block diagram illustrating the physical and logical components of a special-purpose computer device within an electronic transfer network, according to one or more embodiments of the disclosure.

With reference now to FIG. 6, a block diagram of an illustrative computer system is shown. The system 600 may correspond to any of the computing devices or servers of the electronic transfer network 100 described above, or any other computing devices described herein. In this example, computer system 600 includes processing units 604 that communicate with a number of peripheral subsystems via a bus subsystem 602. These peripheral subsystems include, for example, a storage subsystem 610, an I/O subsystem 626, and a communications subsystem 632.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 604, which may be implemented as one or more integrated circuits (e.g., a conventional microprocessor or microcontroller), controls the operation of computer system 600. One or more processors, including single core and/or multicore processors, may be included in processing unit 604. As shown in the figure, processing unit 604 may be implemented as one or more independent processing units 606 and/or 608 with single or multicore processors and processor caches included in each processing unit. In other embodiments, processing unit 604 may also be implemented as a quad-core processing unit or larger multicore designs (e.g., hexa-core processors, octo-core processors, ten-core processors, or greater. As discussed above, in some cases, processing unit 604 may include one or more specialized ASICs designed and configured for cryptocurrency mining and/or specialized cryptographic hardware for handling cryptocurrency transactions.

Processing unit 604 may execute a variety of software processes embodied in program code, and may maintain multiple concurrently executing programs or processes. At any given time, some or all of the program code to be executed can be resident in processor(s) 604 and/or in storage subsystem 610. In some embodiments, computer system 600 may include one or more specialized processors, such as digital signal processors (DSPs), outboard processors, graphics processors, application-specific processors, and/or the like.

I/O subsystem 626 may include device controllers 628 for one or more user interface input devices and/or user interface output devices 630. User interface input and output devices 630 may be integral with the computer system 600 (e.g., integrated audio/video systems, and/or touchscreen displays), or may be separate peripheral devices which are attachable/detachable from the computer system 600.

Input devices 630 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 630 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 630 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 630 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 600 to a user or other computer. For example, output devices 630 may include, without limitation, a variety of display devices that visually convey text, graphics and audio/video information such as monitors, printers, speakers, headphones, automotive navigation systems, plotters, voice output devices, and modems.

Computer system 600 may include one or more storage subsystems 610, including hardware and software components used for storing data and program instructions, such as system memory 618 and computer-readable storage media 616. The system memory 618 and/or computer-readable storage media 616 may store program instructions that are loadable and executable on processing units 604, as well as data generated during the execution of these programs.

Depending on the configuration and type of computer system 600, system memory 618 may be stored in volatile memory (such as random access memory (RAM) 612) and/or in non-volatile storage drives 614 (such as read-only memory (ROM), flash memory, etc.) The RAM 612 may contain data and/or program modules that are immediately accessible to and/or presently being operated and executed by processing units 604. In some implementations, system memory 618 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the non-volatile storage drives 614. By way of example, and not limitation, system memory 618 may include application programs 620, such as client applications, Web browsers, mid-tier applications, server applications, etc., program data 622, and an operating system 624.

Storage subsystem 610 also may provide one or more tangible computer-readable storage media 616 for storing the basic programming and data constructs that provide the functionality of some embodiments. Software (programs, code modules, instructions) that when executed by a processor provide the functionality described herein may be stored in storage subsystem 610. These software modules or instructions may be executed by processing units 604. Storage subsystem 610 may also provide a repository for storing data used in accordance with the present invention.

Storage subsystem 300 may also include a computer-readable storage media reader that can further be connected to computer-readable storage media 616. Together and, optionally, in combination with system memory 618, computer-readable storage media 616 may comprehensively represent remote, local, fixed, and/or removable storage devices plus storage media for temporarily and/or more permanently containing, storing, transmitting, and retrieving computer-readable information.

Computer-readable storage media 616 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 600.

By way of example, computer-readable storage media 616 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 616 may include, but is not limited to, Zip® drives, flash memory cards, universal serial bus (USB) flash drives, secure digital (SD) cards, DVD disks, digital video tape, and the like. Computer-readable storage media 616 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 632 may provide a communication interface from computer system 600 and external computing devices via one or more communication networks, including local area networks (LANs), wide area networks (WANs) (e.g., the Internet), and various wireless telecommunications networks. As illustrated in FIG. 6, the communications subsystem 632 may include, for example, one or more network interface controllers (NICs) 634, such as Ethernet cards, Asynchronous Transfer Mode NICs, Token Ring NICs, and the like, as well as one or more wireless communications interfaces 636, such as wireless network interface controllers (WNICs), wireless network adapters, and the like. Additionally and/or alternatively, the communications subsystem 632 may include one or more modems (telephone, satellite, cable, ISDN), synchronous or asynchronous digital subscriber line (DSL) units, FireWire® interfaces, USB® interfaces, and the like. Communications subsystem 636 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 632 may be detachable components coupled to the computer system 600 via a computer network, a FireWire® bus, or the like, and/or may be physically integrated onto a motherboard of the computer system 600. Communications subsystem 632 also may be implemented in whole or in part by software.

In some embodiments, communications subsystem 632 may also receive input communication in the form of structured and/or unstructured data feeds, event streams, event updates, and the like, on behalf of one or more users who may use or access computer system 600. For example, communications subsystem 632 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 632 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 632 may output such structured and/or unstructured data feeds, event streams, event updates, and the like to one or more data stores 104 that may be in communication with one or more streaming data source computers coupled to computer system 600.

Due to the ever-changing nature of computers and networks, the description of computer system 600 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

In one embodiment of the invention, a method for initiating a similar transaction to one previously initiated by a user is provided. Systems for conducting such methods may also be provided. For example, a specialized transaction recurrence server may conduct such methods. In these or other embodiments, non-transitory machine readable mediums may also be provided which allow processors to implement the methods described The method may include sending a digital receipt for a first transaction to a user. The method may also include deterring reminder information where the reminder information indicates a future time or frequency. In some embodiments, this may involve predicting the reminder information based at least in part on at least one characteristic of the first transaction, and/or transactions previous to it. For example, the amount of the transaction and a day of the week, month, or year (or frequency therein). Furthermore, external calendar information such as dates of holidays (e.g., Memorial Day and/or Christmas) or celebratory days (e.g., Mothers day and/or Halloween) may be compared to the first transaction to predict a date relationship and consequent time/frequency for the reminder information.

In some embodiments, the digital receipt may include a first interactive element. In these embodiments, the user may directly inform the method of the desired reminder information (e.g., timeframe/frequency) by interacting with the first interactive element.

The method may further include sending, upon occurrence of the future time or frequency, a digital reminder to the user, where the digital reminder includes a second interactive element. The method may additionally include receiving an indication that the user has interacted with the second interactive element. The method may moreover include initiating a second transaction having at least one characteristic in common with the first transaction based at least in part on the indication being received.

As described above, the method may include sending a digital receipt for a first transaction to a user, where the digital receipt may include a first interactive element. Thus, a user may have already conducted a transfer, and is now receiving the digital receipt for such transaction, possibly in addition to a paper or hardcopy receipt they also received. The digital receipt may be sent via e-mail, Short Message Service (SMS), and/or other means. The interactive element in the e-mail or SMS may be a Uniform Service Locator (URL) address (i.e., a link) or other mechanism that the user can activate. The interactive element may be conspicuously labeled so that the user is informed that by interacting therewith, they will be allowed to specify instructions on how and when they should be reminded by the method to repeat the transfer or make transfers similar to such original transfer. If a user does not interact with the interactive element, in many embodiments they will not be sent a further reminder to repeat the same or similar transaction. In other embodiments, other systems may provide for reminders to be sent to the user, regardless of whether they request such.

The method may also include determining reminder information predictively or receiving reminder information from the user after the user has interacted with the interactive element, where the reminder information indicates the user should receive at least one digital reminder notification at a future time or frequency. In embodiments where the user provides the reminder information, this may be accomplished via an interactive web page at the destination pointed to, and activated by, the interactive link in the digital receipt. The user may adjust via specifying a future time or frequency, when they will receive reminders to conduct the same or similar transfer again.

Additionally, the user may change aspects of the original transaction so that the reminder offers to conduct an altered, similar transaction. Merely by way of example, the user could alter the identity of the receiver, the amount of the transaction, the currency of the transaction, and/or available pickup methods allowed for the receiver. Other aspects of the original transfer may also be changed by the user during this step.

The method may further include sending, upon occurrence of the future time or frequency, a digital reminder to the user, where the digital reminder includes a second interactive element. The digital reminder, by its content such as text and/or graphics, may offer the user the opportunity to repeat the original transaction, or the original transaction altered by their input from the previous step. The digital reminder may be sent either via a first predetermined channel or a second predetermined channel. The first predetermined channel may be any communication means where content type and/or length in a single message is limited. For example, SMS or other means may have such restrictions. The second predetermined channel may be any communication means where content type and/or length is not limited. For example, e-mail or other means may have no such restrictions.

If the digital reminder is sent via e-mail, the digital reminder may include necessary legal disclosures, pre-disclosure statements, and/or other documents to the user which are required to be provided, by law or otherwise, before a transaction can be commenced. The second interactive element in the e-mail may be a URL address, such that when the user interacts with the second interactive element, it is verified that the user wishes to proceed with the repeat/similar transaction. The URL to which the user is sent may cause such a transaction to occur, and then provide confirmation to the user via an interactive web page of such. This second transaction is likely to have one or more common characteristics with the first transaction depending on the extent to which the user modified the aspects of the first transfer when interacting with the digital receipt.

If the digital reminder is sent via SMS, the second interactive element in the SMS may be a URL address, such that when the user interacts with the second interactive element, the user is taken to a web page which includes necessary legal disclosures to the user which are required to be provided, by law or otherwise, before a transaction can be commenced. On this same page, another interactive element may be present, and upon the interaction with such by the user, the transaction is made to occur, and confirmation is provided to the user of such on another web page. This second transaction is likely to have one or more common characteristics with the first transaction depending on the extent to which the user modified the aspects of the first transfer when interacting with the digital receipt.

In some embodiments, the method may check to make sure that the device to which the digital reminder was sent, and consequent instructions to initiate a second transfer are received from, are the same device, prior to initiating the second transfer. Any number of means may be employed to verify this, including, merely by way of example, checking the media access control (MAC) address of both devices is the same. The method may also check to make sure that the devices from which repeat transaction confirmation is received is the same as the device to which the digital receipt was sent. In either or both cases, additional security is provided by ensuring unknown devices (devices heretofore not associated with the user), are not issuing instructions to conduct transfer without the actual approval of the user.

In these or other embodiments, the method may store a listing of devices known to be associated with the user, for later comparison to devices submitting requests for repeat transfers. In this manner, an additional layer of security may be provided by ensuring instructions for repeat transfers at least appear to be originating from a device known to be associated the user. Such listing may be assembled by identifying and storing identity information regarding devices used by the user to initiate confirmed non-fraudulent transactions or communications with systems conducting the disclosed methods.

Figure 7:
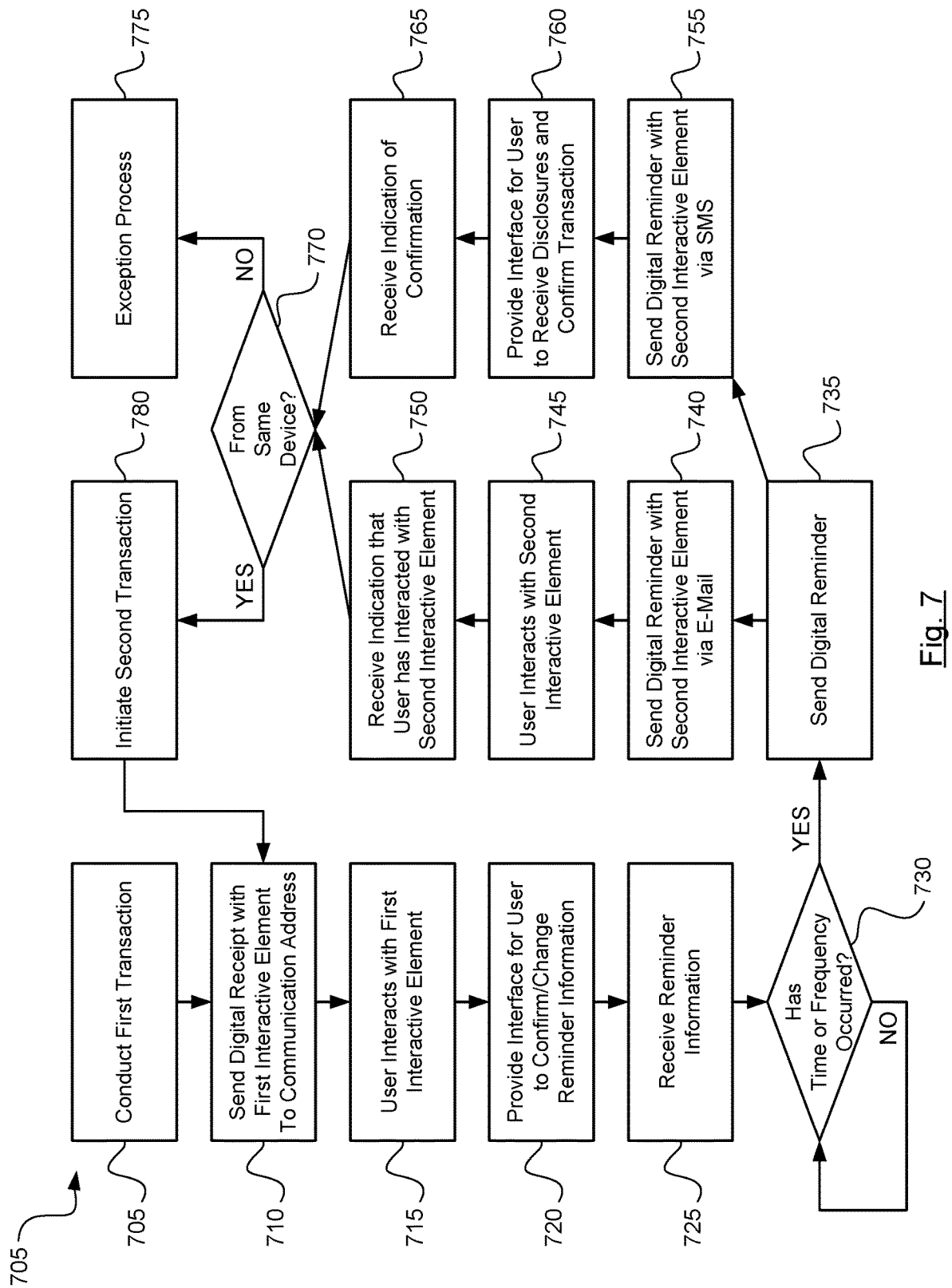
FIG. 7 is a flow chart illustrating one possible method of the invention for initiating a similar transaction to one previously initiated by a user.

Turning now to FIG. 7, a block diagram of the method 700 is shown. At block 705, a first transaction is conducted for the user, possibly using the systems and methods described above. During or after the transaction is conducted, the user may inform the facilitator of the transaction whether they wish to receive a receipt via e-mail or SMS. At block 710, in the manner specified, a digital receipt is transmitted to the user. At block 715, the user may interact with a first interactive element in the digital receipt.

At block 720, an interface may be provided for the user to confirm that they wish to receive follow-up transaction reminders. Additionally, the user may specify what frequency and/or time they would like to receive such reminder(s). The user may also be able to change details of the transfer for which they will be reminded to repeat. For example, the user may change the amount of the transfer or the identity of the person to receive the funds.

At block 725, the reminder information provided by the user is received. This information, like any information discussed herein, is stored for later reference. Specifically, at block 730 it is determined if the time or frequency specified in the reminder information from the user has passed. If not, the time or frequency specified is further awaited. If the time or frequency has occurred, then at block 735 a digital reminder of the transaction, as requested/modified by the reminder information, is sent to the user.

If the reminder was requested via e-mail in the reminder information, or during the previous transaction process, then at block 740 the digital reminder is sent via e-mail to the user. At block 745, the user interacts with the second interactive element within the reminder e-mail. At block 750, the system receives an indication of that interaction, meaning that the user desires to conduct a repeat similar transaction as so specified in the reminder e-mail. In some embodiments, the reminder e-mail may also allow a user to change the characteristics of the repeat similar transaction.

If the reminder was requested via SMS, then at block 755 the digital reminder is sent via SMS to the user. At block 760, an interface, potentially via a web page is provided to the user which includes the required disclosures and an opportunity for the user to confirm they would like to proceed. The user then confirms they would like to proceed via the interface provided, and at block 765, the system receives an indication of that confirmation, meaning that the user desires to conduct a repeat similar transaction as so specified in the reminder SMS and/or the interface. In some embodiments, the interface may also allow a user to change the characteristics of the repeat similar transaction.

At block 770, in some embodiments, the method may determine if the indication of interaction with the second interactive element from the reminder e-mail, or the confirmation from the interface in the case of SMS reminders, was received from the same device to which the reminder e-mail or SMS was originally sent. This may provide an extra layer of protection against a fraudster initiating a transaction which the user does not actually intend to take place. In alternative embodiments, the method may instead determine if the indication of interaction with the second interactive element occurred at a device known to be associated with the user as described above. If the devices are different (or if the interaction with the second interactive element did not come from a device known to be associated with the user), then at block 775 an exception process occurs. The exception process may still allow for the transaction to occur, but additional fraud checking processes may occur in such cases. However, in other cases it may be determined that such a transfer will not be initiated on this basis alone.

If the indication of interaction with the second interactive element from the reminder e-mail, or the confirmation from the interface in the case of SMS reminders, was received from the same device to which the reminder e-mail or SMS was originally sent, or if such a check does not occur in the particular embodiment, then at block 780 the repeat/similar transaction is then repeated. The process may then repeat itself starting at block 710, where the just-initiated transaction becomes the prior transaction for which a digital receipt may be sent.

However, in some embodiments, the yet-to-be-sent reminder may also still reference the original transaction, as well as the more recent transaction. This may depend on user preference as provided to the system, or based on whether details/characteristics of the just-initiated transfer are the same or different than the initial transaction. That is, if the details/characteristics of the just-initiated transaction are different than the original transaction, the future reminder will reference the new transaction details (and possibly also the original transaction details for reference). However, if the details/characteristics of the just-initiated transaction are the same as the original transaction, the future reminder may include the common details/characteristics and merely note the date on which each repeat transaction occurred in the past.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method comprising:
    sending, by a network interface device of a computing device, a first digital communication for a first transaction to a particular device of a user, the first digital communication comprising a first digital receipt with a first interactive element, the first transaction comprising a first set of characteristics;
    receiving, by the network interface device of the computing device, an indication of a first user interaction with the first interactive element, wherein the indication of the first user interaction includes a device identifier of a receiving device;
    determining, by a processor of the computing device, based at least in part on the indication of the first user interaction with the first interactive element, a specification of a future time or frequency;
    sending, by the network interface device of the computing device, upon occurrence of the future time or frequency, a digital reminder to the user, wherein the digital reminder comprises a second interactive element and an indication of a second transaction;
    determining, by the processor of the computing device, based at least in part on an indication of a second user interaction with the second interactive element, a second transaction comprising a second set of characteristics, the second set of characteristics comprising a modified first set of characteristics;
    determining, based at least in part on the device identifier of the receiving device, that a third device from which the second user interaction or a subsequent user interaction is received is neither the particular device of the user nor a second device identified by the processor of the computing device as being associated with the user; and
    blocking, by the processor of the computing device, based at least in part on the determining that the third device is neither the particular device of the user nor the second device identified as associated with the user, the second transaction.

2. The method of claim 1, wherein the first interactive element comprises a Uniform Resource Locator (URL) address.

3. The method of claim 1, wherein the first set of characteristics and the modified first set of characteristics have at least one characteristic in common and at least one distinct characteristic.

4. The method of claim 1, wherein the digital reminder is sent via a short messaging service.

5. The method of claim 1, wherein the digital reminder is sent via electronic mail.

6. The method of claim 1, wherein the digital reminder is sent via a communication path where content type or content length in a single message is not limited.

7. A non-transitory, computer-readable storage medium having stored thereon instructions for causing at least one computer system to perform operations, the operations comprising:
    sending a first digital communication for a first transaction to a particular device of a user, the first digital communication comprising a first digital receipt with a first interactive element, the first transaction comprising a first set of characteristics;

receiving an indication of a first user interaction with the first interactive element, wherein the indication of the first user interaction includes a device identifier of a receiving device;

determining, based at least in part on the indication of the first user interaction with the first interactive element, a specification of a future time or frequency;

sending, upon occurrence of the future time or frequency, a digital reminder to the user, wherein the digital reminder comprises a second interactive element and an indication of a second transaction;

determining based at least in part on an indication of a second user interaction with a second interactive element, the second transaction comprising a second set of characteristics, the second set of characteristics comprising a modified first set of characteristics;

determining, based at least in part on the device identifier of the receiving device, that a third device from which the second user interaction or a subsequent user interaction is received is neither the particular device of the user nor a second device identified as being associated with the user; and blocking, based at least in part on the determining that the third device is neither the particular device of the user nor the second device identified as associated with the user, the second transaction.

8. The non-transitory, computer-readable storage medium of claim 7, wherein the first interactive element comprises a Uniform Resource Locator (URL) address.

9. The non-transitory, computer-readable storage medium of claim 7, wherein the first set of characteristics and the modified first set of characteristics have at least one characteristic in common and at least one distinct characteristic.

10. The non-transitory, computer-readable storage medium of claim 7, wherein the digital reminder is sent via a short messaging service.

11. The non-transitory, computer-readable storage medium of claim 7, wherein the digital reminder is sent via electronic mail.

12. The non-transitory, computer-readable storage medium of claim 7, wherein the digital reminder is sent via a communication path where content type or content length in a single message is not limited.

13. A system comprising:
one or more processors; and
a memory coupled with the one or more processors, the memory configured to store instructions that, when executed by the one or more processors, cause the one or more processors to:
send a first digital communication for a first transaction to a particular device of a user, the first digital communication comprising a first digital receipt with a first interactive element, the first transaction comprising a first set of characteristics;
receive an indication of a first user interaction with the first interactive element, wherein the indication of the first user interaction includes a device identifier of a receiving device;
determine, based at least in part on the indication of the first user interaction with the first interactive element, a specification of a future time or frequency;
send, upon occurrence of the future time or frequency, a digital reminder to the user, wherein the digital reminder comprises a second interactive element and an indication of a second transaction;
determine based at least in part on an indication of a second user interaction with the second interactive element, a second transaction comprising a second set of characteristics, the second set of characteristics comprising a modified first set of characteristics;
determine, based at least in part on the device identifier of the receiving device, that a third device from which the second user interaction or a subsequent user interaction is received is neither the particular device of the user nor a second device identified as being associated with the user; and
block, based at least in part on the determining that the third device is neither the particular device of the user nor the second device identified as associated with the user, the second transaction.

14. The system of claim 13, wherein the first interactive element comprises a Uniform Resource Locator (URL) address.

15. The system of claim 13, wherein the first set of characteristics and the modified first set of characteristics have at least one characteristic in common and at least one distinct characteristic.

16. The system of claim 13, wherein the
digital reminder is sent via a short messaging service.

17. The system of claim 13, wherein the
digital reminder is sent via electronic mail.

* * * * *